United States Patent [19]

Nakazawa

[11] 4,423,346

[45] Dec. 27, 1983

[54] SAFETY DEVICE FOR PREVENTING OVERSPEED

[75] Inventor: Yuki Nakazawa, Katsuta, Japan

[73] Assignee: Hitachi Koki Company, Limited, Tokyo, Japan

[21] Appl. No.: 263,240

[22] Filed: May 13, 1981

[51] Int. Cl.$^3$ .................................. H02H 5/00

[52] U.S. Cl. .................................. 310/68 E; 200/28; 200/80 R

[58] Field of Search .................. 310/68 E, 19, 31, 71; 200/28, 80 R

[56] References Cited

U.S. PATENT DOCUMENTS

| | | | |
|---|---|---|---|
| 1,075,987 | 10/1913 | McMahon | 310/68 E |
| 1,100,748 | 6/1914 | Laycock | 200/80 R |
| 1,122,332 | 12/1914 | Sullivan | 200/80 R |
| 2,562,322 | 7/1951 | Lyons | 200/80 R |
| 3,154,649 | 10/1964 | Schuh et al. | 200/80 R |
| 3,632,922 | 4/1970 | Baumoel | 200/80 R |

*Primary Examiner*—J. D. Miller

*Assistant Examiner*—D. L. Rebsch

*Attorney, Agent, or Firm*—Pollock, Vande Sande & Priddy

[57] ABSTRACT

A safety device for preventing overspeed of a rotary shaft driven by an electrical motor is arranged to cut a portion of an electrical circuit feeding the motor with electrical power, by making a cutter received in a rotary member jump up or protrude by a centrifugal force acting on the cutter, so that dangerous overspeed is prevented. The cutter is movably received in a radial bore made in the rotary member, and receives a tensile force from a coil spring which is fixedly supported by the rotary member at one end of the spring. An adjusting screw, which is a cylindrical member, is provided for biasing the cutter against the tensile force from the spring. A critical rotational speed, above which the cutter jumps to break the electrical circuit, can be freely adjusted by changing the position of the adjusting screw. The change in position of the adjusting screw results in both the change of an eccentric distance of the cutter and the change of the tensile force of the spring.

1 Claim, 8 Drawing Figures

SAFETY DEVICE FOR PREVENTING OVERSPEED

BACKGROUND OF THE INVENTION

This invention relates generally to a device, such as a governor for preventing overspeed by cutting or breaking an electrical circuit when the rotational speed of a rotary member driven by an electrical motor exceeds a predetermined value, and particularly, the present invention relates to a safety device for various electrically driven tools, such as a disk grinder, an electric planer, an electric circular saw, and the like.

Certain conventional electrical tools, such as a disk grinder, are equipped with a safety device having a cutter which is arranged to protrude or jump up radially with respect to the rotary shaft of the tool when the rotational speed of the rotary shaft exceeds a predetermined speed. The cutter is received in a rotary member, and is normally biased by a force of an elastic member, such as a coil spring, toward the center of the rotary member. The cutter protrudes outward when the centrifugal force applied to the cutter becomes greater than the force of the elastic member. A power feed path is located stationarily outside the rotary member so that the feed path will be broken when the cutter of the rotary member protrudes outward.

The above-mentioned predetermined rotational speed of the rotary shaft or the rotary member, above which the cutter protrudes outward, is determined by the mass of the cutter and a tensile force applied from the elastic member to the cutter in the radial direction of the rotary member. Meanwhile, the predetermined rotational speed has great variations throughout a number of products of safety devices for preventing overspeed due to variations in sizes, weights and characteristics of various parts which constitute the safety device. In order to reduce such undesirable variations throughout a number of products, it is theoretically possible to change the weight of the cutter and/or the characteristic of the elastic member. However, it is very troublesome and time-consuming to perform such an adjustment after the safety device has been assembled. Furthermore, when it is intended to change the predetermined rotational speed above which the cutter protrudes outward, the cutter has to be replaced with another having different weight or the elastic member has to be replaced with another having different characteristics.

For these reasons, the predetermined rotational speed for disabling the electrical tool equipped with such a conventional safety device is not necessarily set to a most desirable value, while the predetermined rotational speed could hardly be changed.

According to one conventional safety device of this sort, an initial tension of the elastic member for drawing the cutter towards the rotary member is adjustable by changing the attaching position of the elastic member. However, in this conventional arrangement, since only the initial tension can be adjusted, a critical value of the rotational speed, above which the cutter protrudes, drastically varies when the attaching position of the elastic member is changed. Therefore, fine adjustment of the critical value of the rotational speed has been difficult hitherto.

SUMMARY OF THE INVENTION

This invention has been developed in order to remove the above-mentioned disadvantages and drawbacks inherent to the conventional safety devices.

It is, therefore, an object of the present invention to provide a new and useful safety device for preventing overspeed in which a given or critical rotational speed, above which a cutter projects outward for breaking an electrical circuit, is variable or adjustable.

According to a feature of the present invention, the safety device is simple in construction, and is readily manipulated to adjust the above-mentioned critical rotational speed.

The safety device according to the invention comprises a rotary member arranged to rotate with a rotary shaft driven by an electric driving mechanism, such as an electric motor. A bore is made in the rotary member in its radial direction so as to receive a cutter which will project outside the rotary member when the rotary member rotates at a speed greater than a given critical speed. The cutter is received in the bore in such a manner that it is movable in the radial direction of the rotary member. One end of the cutter is connected to an elastic member which is fixedly connected to the rotary member at the other end thereof. Although the above-described structure is substantially the same as that of conventional safety devices, an adjusting member is additionally provided according to the present invention. The adjusting member is attached to the inside of the bore of the rotary member in such a manner that it biases the cutter against the tensile force of the elastic member. The position of the adjusting member in the radial direction of the rotary member can be adjusted because the adjusting member is so threaded as to be engaged with a threaded portion of the bore.

As is well known, when a cutter is eccentric with respect to the center of the rotary member by a distance R, and the mass of the cutter is expressed in terms of m, a centrifugal force of $mR\omega^2$ (wherein $\omega$ is the angular velocity of the rotary member) is applied to the cutter. An initial strain is applied to the elastic member, which is linked with the cutter, so that load or initial tension $F_0$ is applied to the cutter. Under this condition, if the centrifugal force acting on the cutter is below the load $F_0$, the cutter remains stationary with respect to the rotary member. Since the cutter is movable in the radial direction of the rotary member, when the centrifugal force exceeds the load $F_0$, the cutter moves outward. Thus the value of the centrifugal force increases as the cutter moves outward, and therefore, a tip portion of the cutter instantaneously projects outside the rotary member to break the electrical circuit. The critical rotational speed of the rotary member, above which the tip portion of the cutter projects outside the rotary member, is determined by the characteristic of the elastic member, the initial tension $F_0$, the mass m of the cutter, and the eccentric distance R of the cutter.

The inventor of the present invention has made an improvement by arranging the structure of the safety device such that the initial strain i of the elastic member and the eccentric distance R of the cutter from the center of the rotary member are both changable simultaneously by adjusting the position of the above-mentioned adjusting member.

In accordance with the present invention there is provided a safety device for preventing overspeed for use with a device having a rotary shaft driven by an electric driving mechanism, comprising: (a) a rotary member arranged to rotate with said rotary shaft; (b) a feed path through which electrical power is supplied to said electric driving mechanism, said feed path being located in the vicinity of said rotary member; (c) a cutter movably received in a radial bore made in said rotary member so that said cutter is contactable with said feeding path when protruding outwardly; (d) an elastic member having one end fixedly supported with respect to said rotary member, and another end connected to said cutter; and (e) means for biasing said cutter against the tensile force of said elastic member, said means being received in said bore of said rotary member in such a manner that the position in the radial direction of said rotary member is adjustable.

In accordance with the present invention there is also provided a safety device for preventing overspeed of a rotary mechanism driven by an electrical driving mechanism, having a feed path for supplying said driving mechanism with electrical power; a rotary member driven by said driving mechanism; a cutter provided inside said rotary member, and attached in such a manner that said cutter is movable in the radial direction of said rotary member so as to cut said feed path when the rotational speed of said rotary member reaches a predetermined value; and an elastic member for giving a tensile force to said cutter; chararacterized by an adjusting member attached to said rotary member in such a manner that the position of said adjusting member in the radial direction of said rotary member is adjustable, said adjusting member biasing said cutter against said tensile force so that the length of said elastic member can be adjustable.

BRIEF DESCRIPTION OF THE DRAWINGS

The object and features of the present invention will become more readily apparent from the following detailed description of the preferred embodiment taken in conjunction with the accompanying drawings in which.

The same or corresponding elements and parts are designated at like numerals throughout the drawings.

DETAILED DESCRIPTION OF THE PREFERRED EMBODIMENT

Figure 1:
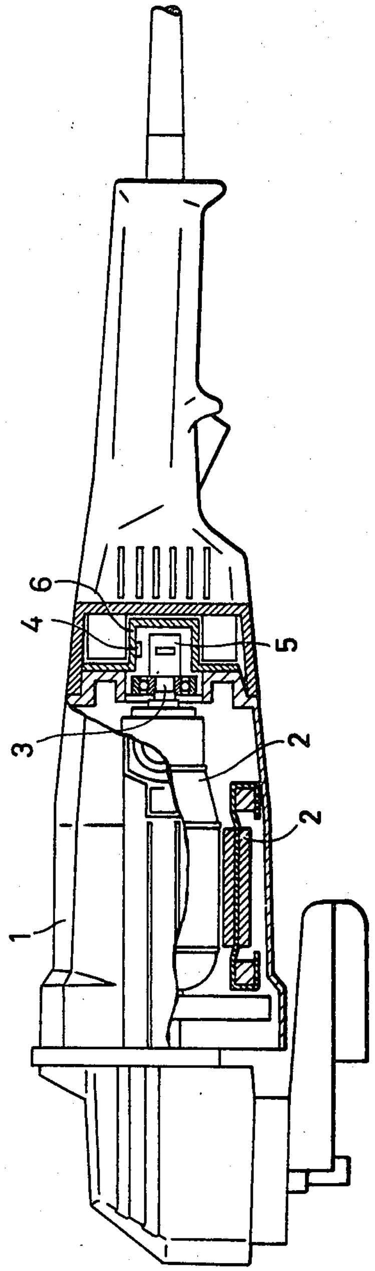
FIG. 1 is a schematic view of a disk grinder equipped with a safety device according to the present invention.

FIG. 1 illustrates a disk grinder to which the present invention is adapted. Although the invention will be described in connection with the disk grinder of FIG. 1, the safety device according to the present invention may be applied to any device or tool having a rotary shaft arranged to be driven by an electrical motor.

Figure 2:
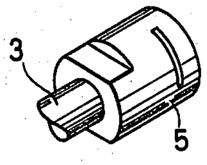
FIG. 2 is a perspective view of the rotary member of FIG. 1.
Figure 4:
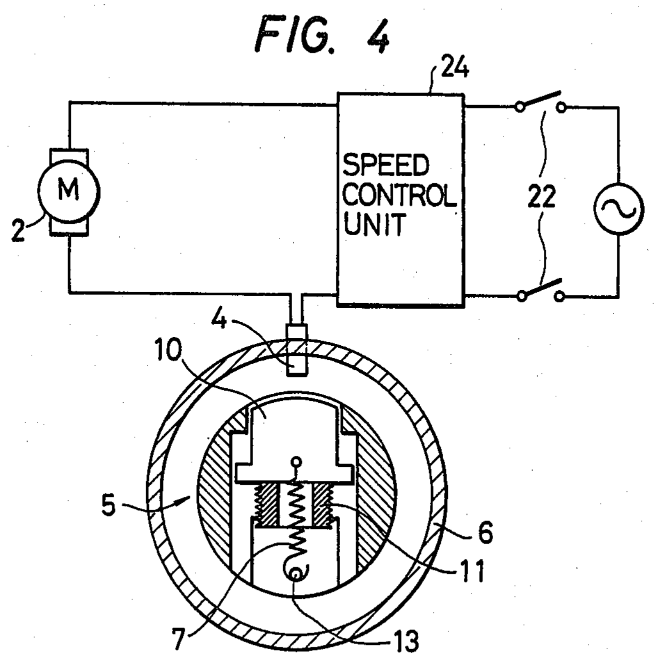
FIG. 4 is a cross-sectional view of the casing shown in FIG. 1, and an electrical circuit diagram of the disk grinder of FIG. 1.

The disk grinder of FIG. 1 comprises a housing 1, a driving mechanism 2, such as an electrical motor, fitted in the casing. The driving mechanism 2 or motor has a rotary shaft 3 fixedly engaged, at a first end, with a rotary member 5 which is rotatably received in a casing 6 as shown in FIG. 2. The motor 2 is supplied with electrical power via an electrical driving circuit as shown in FIG. 4. An A.C. voltage applied through switches 22 to a speed control unit 24 is fed via a feed path 4 to the motor 2. The above-mentioned electrical circuit including the feed path 4 is the same as the conventional one, and therefore, detailed description thereof is omitted. The feed path 4 is arranged to break the electrical circuit when a cutter 10, which will be described hereunder, impacts the same.

Figure 5:
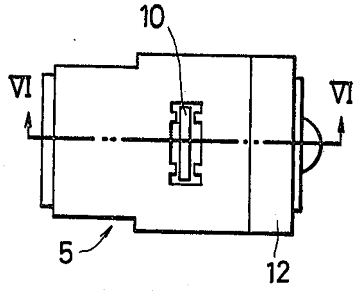
FIG. 5 is a front view of the rotary member shown in FIG. 1.
Figure 6:
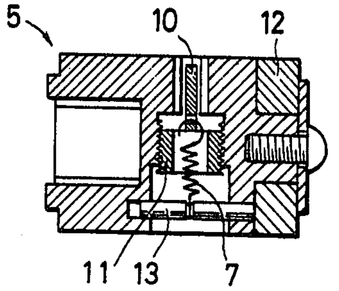
FIG. 6 is a cross-sectional view of the rotary member taken along the line VI—VI of FIG. 5.
Figure 7:
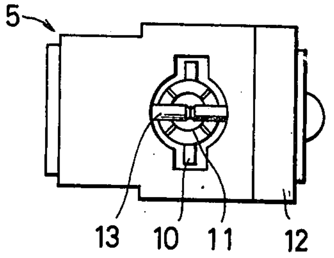
FIG. 7 is another view of the rotary member viewed in the direction of an arrow in FIG. 6.

The novel feature of the present invention resides in the structure inside the rotary member 5. FIG. 4 shows a cross-sectional view of the casing 6 and the rotary member 5, while FIG. 5 shows a front view of the rotary member. A cross-sectional view of the rotary member taken along the line VI—VI of FIG. 5 is shown in FIG. 6. FIG. 7 shows another view of the rotary member 5 viewed from the direction of an arrow S of FIG. 6.

As best seen in FIGS. 4 and 6, a radial bore is made in the rotary member 5. A pin 13 is fixedly attached to the rotary member in the bore. A cutter 10 is movably received in the bore at the other side of the pin 13 with respect to the center or rotary axis of the rotary member 5. A coil spring 7, which functions as an elastic member, is connected at its first end to the pin 13, and is connected, at its other end, to the cutter 10. A portion of the bore is threaded so that a cylindrical adjusting member 11 can be engaged therewith. The cylindrical adjusting member 11 has a threaded portion at its outer surface, and this adjusting member 11 may be referred to as an adjusting screw 11. The above-mentioned coil spring 7, which is interposed between the pin 13 and the cutter 10 with a suitable tension, penetrates a bore of the cylindrical adjusting screw 11. The adjusting screw 11 may change its position in the radial direction of the rotary member 5 by rotating it clockwise or counterclockwise. As seen in FIG. 4, the cutter 10 has a lower end whose width is wider than the outer diameter of the adjusting screw 11. With this arrangement, the lowest position of the cutter 10 is defined by the top position of the adjusting screw 11 because the upper end of the adjusting screw 11 is in contact with the lower end of the cutter 10. The position and size of each of the pin 13, the adjusting screw 11, the spring 7 and the cutter 10 are selected so that a given tension is applied to the spring 7 when these parts are assembled. The aforementioned feed path 4 is made of a copper piece, and is attached to the casing 6 in such a manner that the feeding path 4 faces the locus of the cutter 10. With this provision, when the cutter 10 projects outward causing the tip portion thereof to protrude to the outside of the rotary member 5, the feed path 4 will be broken when impacted by the cutter 10. In FIG. 6, the reference numberal 12 indicates a magnet fixed to one side of the rotary member 5 by means of a screw. The magnet 12 will be used to detect the rotational speed of the rotary member 5 by means of a suitable magnetosensitive pickup (not shown). The pickup may be connected to the speed control unit 24 to supply information of rotational speed so that the speed control unit 24 controls the voltage applied to the motor 2 to maintain the speed at a desired constant value. When the speed control unit 24 satisfactorily operates, the rotational speed of the motor 2 is maintained at the desired constant value, and in case of malfunction of the speed control unit 24 or the pickup, the speed of the motor may be excessively increased resulting in a dangerous condition. At this time, the safety device according to the present invention operates to break the electrical circuit which feeds the motor 2 with electrical power.

As described in the above, since the position of the adjusting screw 11 may be freely changed by rotating the same, the lowest position of the cutter 10 may be freely set, while the initial strain or tension of the spring 7 may be freely adjusted. Namely, both the initial tension $F_0$ of the elastic member, i.e. the spring 7, and the eccentric distance R of the cutter 10 may be simultaneously changed by adjusting the position of the adjusting screw 11.

Figure 3:
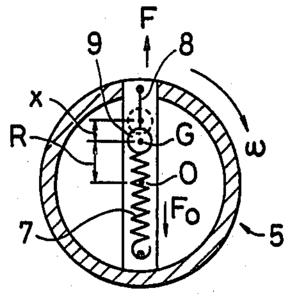
FIG. 3 is an explanatory view useful for understanding the operation of the safety device according to the present invention.

The operational principle of the safety device according to the present invention will be described with reference to FIG. 3. In FIG. 3, the reference F indicates a centrifugal force acting on the cutter 10 which is illustrated in the form of a circular weight 9 for simplicity. The reference R indicates the eccentric distance of the weight 9; G, a center of gravity of the weight 9; O, an axis of rotation of the rotary member 5; and x, a displacement of the weight 9 from its original position. It is assumed that the spring constant of the coil spring 7 is expressed in terms of k, and the mass of the weight 9 is expressed in terms of m. The values of m and k are respectively selected so that the critical rotational speed, which is expressed in the form of angular velocity ω, satisfies the following formula:

$$\omega^2 > k/m \qquad (1)$$

FIG. 3, the weight 9 is being pulled by a strap 8 upwardly, so that an initial tension $F_0$ acts on the spring 7. Assuming that the angular velocity of the rotary member 5 is expressed in terms of $\omega_0$ in the case that the initial tension $F_0$ is in balance with the centrifugal force F:

(A) when $\omega \leqq \omega_0$ $$F_0 \geqq mR\omega^2 \qquad (2)$$

The above formula (2) shows that the initial tension $F_0$ of the spring 7 is always equal to or greater than the centrifugal force F. Therefore, the weight 9 does not move.

(B) when $\omega > \omega_0$, $$F_0 < mR\omega^2 \qquad (3)$$

Under this condition, the centrifugal force F is greater than the initial tension $F_0$ of the spring 7, and therefore, the weight 9 moves radially and outwardly. Suppose that the displacement x of the weight 9 assumes a given value which is greater than zero, the centrifugal force F and the tension Fx of the spring 7 are respectively given by the following formulas (4) and (5):

$$F = m(R+x)\omega^2 \qquad (4)$$

$$Fx = kx + F_0 \qquad (5)$$

$$F - Fx = m(R + x)\omega^2 - (kx + F_0) = (mR\omega^2 - F_0) + x(m\omega^2 - k) > 0 \qquad (6)$$

because $mR\omega^2 > F_0$ from formula (3);

$\omega^2 > k/m$ from formula (1); and $x > 0$.

Therefore, $$F > Fx \qquad (7)$$

Namely, when the actual angular velocity exceeds the angular velocity $\omega_0$ at which the initial tension $F_0$ is in equibrium with the centrifugal force F, the force equibrium is lost, so that the centrifugal force F becomes greater than the tension Fx of the spring 7. As a result, the weight 9 jumps or protrudes instantaneously in the radial direction toward the outside of the rotary member 5.

The critical rotational speed, above which the cutter 1 corresponding to the above-mentioned weight 9 jumps, can be determined by simultaneously adjusting the eccentric distance R of the cutter 10 and the initial tension $F_0$ of the spring 7 by means of the aforementioned adjusting screw 11. Since two values, i.e. R and $F_0$, can be simultaneously changed according to the present invention, fine adjustment may be more readily performed than in the above-described conventional arrangement in which only the initial tension $F_0$ of the spring can be adjusted. Such a fine adjustment may be needed because required performance meeting a designed value is not necessarily obtained although various parts of the safety device have been manufactured with sizes within the tolerance.

Figure 8:
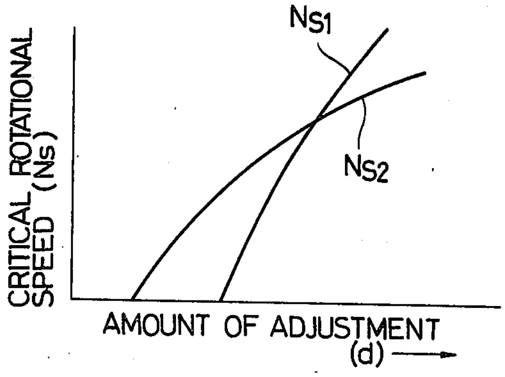
FIG. 8 is a graphical representation showing accuracy of the critical rotational speed adjustment attained by the present invention with respect to that of a conventional device.

The above-described feature of the present invention will be further described with reference to a graphical representation of FIG. 8. In the graph of FIG. 8, the amounts of adjustment d are plotted along the abscissa, while the values of the critical rotational speed Ns, above which the cutter 10 protrudes, are alotted along the ordinate. A curve Ns1 represents the variable values of the critical rotational speed Ns obtained when only the initial tension $F_0$ of the spring 7 is adjusted in the same manner as in the conventional safety device, while another curve Ns2 represents the variable values of the critical rotational speed Ns obtained when both the initial tension $F_0$ of the spring 7 and the eccentric distance R of the cutter 10 are simultaneously changed as described in connection with the above embodiment. In order to change only the initial tension $F_0$ of the spring 7, the position of the pin 13 is moved up and down, while the position of the adjusting screw 11 is maintained as is. Namely, the amounts of adjustment d for the curve Ns1 corresponds to the displacement of the pin 13, while the amounts of adjustment d for the curve Ns2 corresponds to the above-mentioned displacement of the adjusting screw 11.

The value of the critical rotational speed in accordance with the curves Ns1 and Ns2 are respectively expressed by:

$$Ns1 = P\sqrt{\frac{k(i+d)}{mR}} = P\sqrt{\frac{F_0 + kd}{mR}} \qquad (8)$$

-continued $$Ns2 = P\sqrt{\frac{k(i+d)}{m(R+d)}} = P\sqrt{\frac{F_0 + kd}{m(R+d)}} \quad (9)$$

wherein P is a constant.

As is apparent from the difference in curves Ns1 and Ns2 of FIG. 8, the slope of the curve Ns2 is gentler than that of the other curve Ns1. Namely, it can be said that fine adjustment can be more readily performed with the safety device according to the present invention than with a conventional safety device.

From the foregoing description it will be understood that both the eccentric distance R of the cutter 10 from the center of the rotary member 5 and the initial tension $F_0$ of the spring 7 or elastic member can be simultaneously adjusted by changing the position of the adjusting screw 11. Therefore, the critical rotational speed can be freely changed to a desired value even though the safety device has already been assembled.

Accordingly, when a number of products are mass produced, the variations in the critical rotational speeds can be adjusted to a given desired value, providing uniform quality of products. Furthermore, since the slope of variation of the critical rotational speed is relatively gentle, fine adjustment can be readily performed.

The above-described embodiment is just an example of the present invention, and therefore, it will be apparent for those skilled in the art that various modifications and variations may be made without departing from the spirit of the present invention.

What is claimed is:

1. A safety device for preventing overspeed for use with a device having a rotary shaft driven by an electric driving mechanism, comprising:

(a) a rotary member arranged to rotate with said rotary shaft;

(b) a feeding path through which electrical power is supplied to said electric driving mechanism, said feeding path being located in the vicinity of said rotary member;

(c) a cutter movably received in a radial bore formed in said rotary member so that said cutter is contactable with said feeding path when protruding outwardly in response to centrifugal force thereon;

(d) a tension spring having one end fixedly supported with respect to said rotary member, and another end connected to said cutter; and (e) means for biasing said cutter against the tensile force of said tension spring, said means being received in said bore of said rotary member in such a manner that the position in the radial direction of said rotary member is adjustable, the means having a bore at its center so that said tension spring penetrates therethrough;

said outward protrusion of the cutter occurring when centrifugal force on the mass of the cutter exceeds the tensile force of the spring.

* * * * *